INVENTOR.
B. F. LOEWEN

BY Hudson & Young

ATTORNEYS

United States Patent Office 3,004,833
Patented Oct. 17, 1961

3,004,833
OPERATION OF AN OIL SEAL FOR ELECTRICAL TERMINALS OF AN ELECTROPRECIPITATOR
Bruno F. Loewen, Borger, Tex., assignor to Phillips Petroleum Company, a corporation of Delaware
Filed May 4, 1959, Ser. No. 810,920
4 Claims. (Cl. 23—209.4)

This invention relates to electroprecipitators. In one aspect it relates to an improved oil seal for keeping dust away from the electrical connections in the precipitator seal zone. In another aspect it relates to a method for keeping carbon black away from electrical equipment in electroprecipitators used for separating carbon black from carbon black production furnace effluent gases.

In the operation of electroprecipitators for separating carbon black from gases, it has been customary to use an oil seal to keep the carbon-containing gases from contacting the electrical equipment. If the smoke is allowed to contact the electrical equipment, short circuits may occur which may burn conductors or may overheat post insulators. In many industries where electroprecipitators are used, it is practical to recirculate sealing oil after filtering or settling out contaminating solids from the oil which has been passed through the sealing zone. However, in the operation of carbon black production plants, it has been found that seal oil becomes contaminated with carbon black and because the carbon black particles are extremely small, only a portion of the contaminating carbon black will settle out even upon standing for long periods of time. It is extremely difficult, if not impossible, to filter all of the carbon black from the oil. This type of contamination makes it necessary to add continuously new oil and to remove at least some of the used oil, or to replace all of the oil with new oil at frequent intervals. Even though such practices are followed, it has been found that there are about two short circuits per month. When a short circuit does occur, it is necessary to shut down the precipitator and to drain all of the oil from the seal, flush out the seal tank and refill with new oil. This operation is not only a costly and time-consuming task but it also removes the precipitator from use for 4 to 6 hours during the cleaning operation. Down time of a commercial operation obviously reduces plant output.

In the past it has been the practice to add an inert clean gas to blanket the oil in the oil seal and to create a higher positive pressure in the seal zone than in the precipitator, thereby providing flow of clean gas from the seal zone into the precipitator. This procedure was intended to prevent gases containing carbon black from entering the seal oil. Combustion gases have been used for this purpose but have not proven entirely satisfactory because occasionally the combustion gas generator may fail and permit carbon black-containing gases to contact the oil. Natural gas may need to be purchased in order to produce clean combustion gases for this sealing operation and the cost of such gas is, in the light of this invention, an unnecessary cost. By the practice of this invention inert blanketing gas is not required. Another disadvantage in using combustion gases is that frequently they enter the oil seal zone at a relatively high temperature and high temperature gases frequently cause undue evaporation losses of the seal oil. Not only is there a loss in volume of the sealing oil, but this evaporated oil is condensed on the electrical equipment which the oil is intended to protect. Some of the oil lost by evaporation from the seal zone enters the actual carbon black precipitator and condenses on the carbon black. When oil is deposited on the black, the black may not be suitable for certain uses. When the oil is condensed on the post insulators in the electrical compartment, the way is laid open for short circuits which may cause additional precipitator trouble. Still another disadvantage in using the inert gas is that the gas stream passes into the gas-containing carbon black in the precipitator thereby increasing the volume of gases being processed. This hot, inert gas frequently increases the temperature of the carbon laden gases being treated in the precipitator from 25 to 50° F.

It has been found in practice that the use of an inert sealing gas does not eliminate but merely retards the seal oil contamination.

I have found that by using the charge oil to the carbon black furnace reactors in the oil seal of electrostatic precipitators as a continuous stream injected tangentially and at a fairly high velocity below the surface of the oil in the seal tank of the precipitators, the precipitators are able to operate for much longer periods of time between forced shutdowns because of short circuits. In carrying out this invention, I pump carbon black furnace charge oil from an oil storage tank and direct it tangentially into the oil seal compartment of a precipitator and subsequent allow it to overflow therefrom into a small surge tank. The oil is actually injected tangentially through one or more nozzles into the seal oil in the oil seal compartment at such a velocity as to cause continuous circulation of the oil in the seal zone so that carbon black which otherwise would settle out is not given such an opportunity. From the small surge tank the used seal oil may be pumped directly into the charge oil stream passing to carbon black production furnaces, or the oil may be passed into the charge oil storage tank. When this carbon-containing oil is passed into the furnace charge oil storage tank, contamination of the main body of charge oil with respect to the free carbon content is small because the volume of used seal oil is small in comparison to the volume of oil in the tank, and this contaminated oil is perfectly suitable for the production of carbon black. Since the used seal oil is not directly recirculated to the seal zone, the operation involves substantially a once-through operation and opportunity is not given for oil to stand quietly in the sealing zone and to become unduly contaminated. Thus, fresh or substantially fresh charge oil is always injected into the sealing zone.

An object of this invention is to provide an effective sealing means to keep dust from the electrical equipment of electroprecipitators. Another object of this invention is to provide means for maintaining an effective oil seal to keep dust from the electrical equipment of electroprecipitators. Still another object of this invention is to provide an inexpensive and trouble-free means to keep dust from the electrical equipment of electroprecipitators. Yet another object of this invention is to provide a method for maintaining an effective oil seal to keep carbon black from the gases being treated from the high potential electrical equipment of electroprecipitators operating on carbon black-containing gases. Still other objects and advantages of my invention will be realized upon reading the following disclosure which, taken with the attached drawing, forms a part of this specification.

In the drawing, FIGURE 1 represents diagrammatically one form of apparatus useful in carrying out the process of this invention in a furnace carbon black manufacturing plant.

Figure 1:
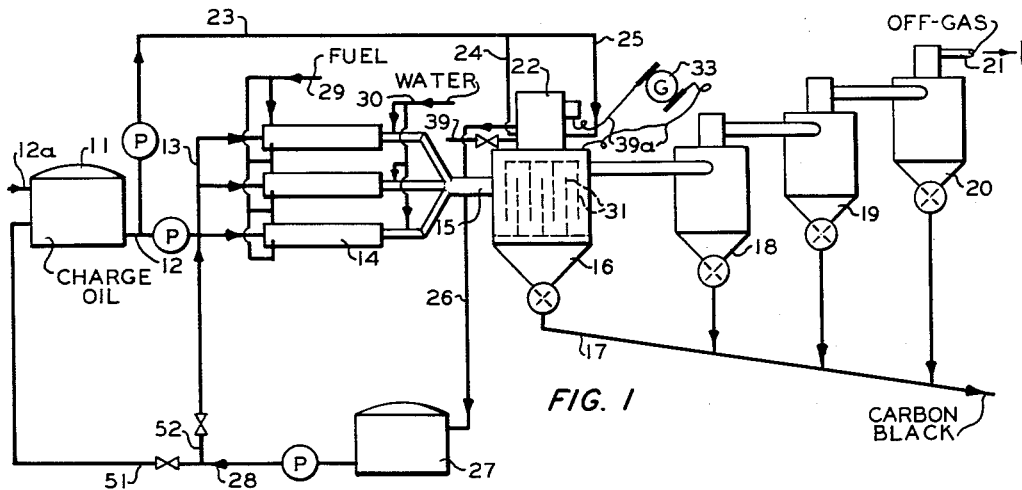

In FIGURE 1 of the drawing references numeral 12a identifies a conduit for passing carbon black furnace charge oil from a source, not shown, into a storage tank 11. From tank 11 charge oil is pumped through a line 12 to a manifold 13 from which the oil passes as charge oil to the respective carbon black producing furnaces 14. Not shown in this drawing are heaters for vaporizing the charge oil just prior to its entry into the several furnaces. Free oxygen-containing gas, such as air, or air containing a combustible gas, is introduced through a manifold line 29 for heating up the furnace and for maintaining furnace temperature during operation. A manifold pipe 30 conducts water from storage, now shown, for spray quenching the furnace effluent gases containing carbon black. The furnace effluent gases are collected in a pipe 15 and are passed into an electroprecipitator 16. This precipitator is provided with electrodes 31 for imparting electrical charges to the carbon black for agglomeration purposes. Electric current under high potential is conducted from a source 33 to the wall of vessel 16 as a ground and to an oil seal compartment 22 of the precipitator. Gases partially depleted of their carbon black content are passed serially into a plurality of cyclone separators 18 and 19 for further recovery of carbon black. If so desired, other means, such as bag filters, may be provided for recovering final traces of carbon black from the effluent gas leaving the series of cyclone separators. Such a bag filter apparatus is diagrammatically illustrated and is identified by reference numeral 20. Off gas from filter 20 passes through a conduit 21 to the atmosphere or to such other disposal or subsequent treatment or use as desired. Conduit 17 passes carbon black from the precipitator, the cyclones and the filter to such disposal or storage as desired.

A pipe 23 is attached to pipe 12, as illustrated, for passage of a portion of the carbon black charge oil feed to the oil seal section of the precipitator. As illustrated in FIGURE 1, oil is passed from pipe 23 through a pair of branch pipes 24 and 25 to opposite sides of the seal zone 22. From pipes 24 and 25, the oil enters the seal zone through nozzles 40 and 41, respectively, in a direction substantially tangent to the outer wall of zone 22. Nozzles 40 and 41 are not spray nozzles, but are nozzles to give velocity to incoming oil to cause the oil in the seal zone to circulate or flow around the zone following a circular path in order to hold all carbon black, or as nearly all as possible, in suspension to prevent settling or adherence of carbon black on metal parts. Overflow oil from this seal zone or apparatus leaves by way of a pipe 26 and flows into a surge tank 27. This surge tank 27 is not to provide settling time for carbon black, but it is primarily a surge tank. From this tank 27 the used seal oil is passed through a pipe 28 and, when desired, the oil is passed through a pipe 52 and combined with fresh charge oil from tank 11 on its way to the carbon black production furnaces 14. If desired, however, the used seal oil is passed from pipe 28 through a pipe 51 into the furnace charge oil tank 11 and is therein mixed with the charge oil.

In the operation of the embodiment of apparatus illustrated in FIGURE 1, carbon black producing furnaces or reactors 14 may be operated in accordance with U.S. Patent 2,375,795. According to the method of operation described in this patent, vaporous oil for producing carbon black is introduced axially into the carbon black furnace and a free oxygen-containing gas, such as air, is introduced into the furnace tangentially or is introduced tangentially in conjunction with a fuel gas for maintaining conversion temperature.

Figure 2:
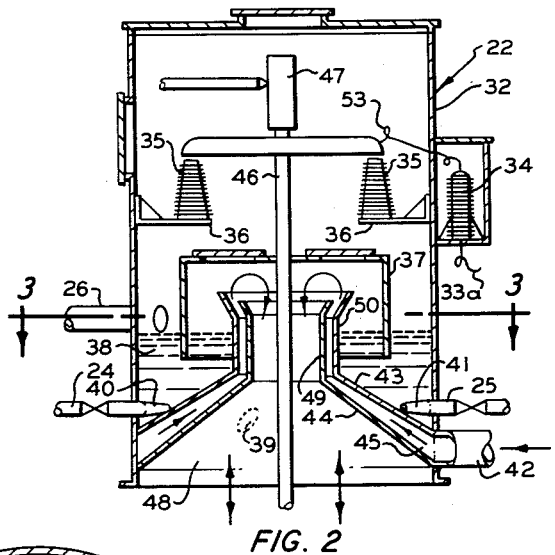
FIGURE 2 is an elevational view, partly in section, and in detail, of a portion of the apparatus of FIGURE 1.
Figure 3:
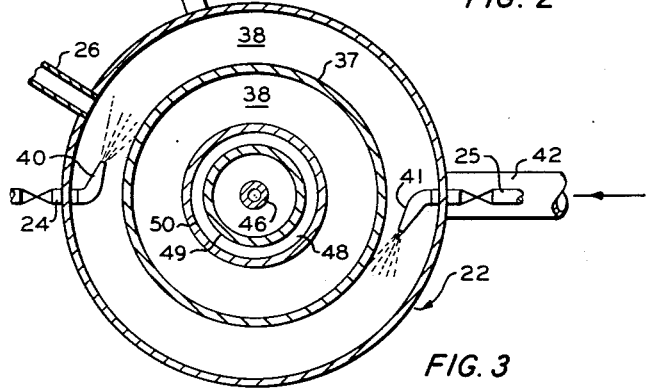
FIGURE 3 is a sectional view taken on the line 3—3 of FIGURE 2.

FIGURE 2 of the drawing is an elevational view, partly in section, and in detail, of an oil seal vessel such as vessel 22 heretofore mentioned as a seal zone in the discussion of FIGURE 1. This oil seal vessel 22 is mounted on the top of the electroprecipitator 16 and is open thereto as indicated by the double ended arrows at the bottom of FIGURE 2. Element 43 is a truncated conical shaped member and is the bottom of the oil containing portion of the seal vessel. A lake of oil 38 in the seal vessel is bounded by the aforementioned conical bottom 43, the inner surface of side wall 32 and the outer surface of a cylindrical wall 50. Extending into the lake of oil is a bell 37 which provides a partition between the electrical terminal containing portion of the seal vessel 22 and the carbon black containing portion or space 48. This bell is supported by a support rod or tube 46, as illustrated. This support rod or tube 46, in addition to supporting bell 37, also supports a portion of the electrodes illustrated in FIGURE 1; and furthermore, it serves as a conductor for passage of high potential electricity from cable 53 to these electrodes. This electrode support rod 46 is insulated from wall 32 by insulators 35 which are supported by brackets 36. Element 47 is a high tension knocker or rapper for knocking or jarring carbon black from the electrodes. An insulator 34 is mounted adjacent the outer surface of wall 32 and insulates cable 33a from the metallic portion of the system. Pipes 24 and 25 are provided at their inner ends in the vessel with nozzles 40 and 41, respectively. These nozzles are intended to impart appreciable velocity to the incoming seal oil so that oil 38 is circulated and agitated sufficiently that there is no appreciable settling or adherence of the carbon black on the surface of cone 43. Furthermore, the circulation of the oil also prevents adherence of the carbon black to the outer surface of the cylinder 50, to either the inner surface or outer surface of the lower portion of bell 37, or the inner surface of wall 32. Thus, all metallic surfaces in contact with the oil are maintained relatively free of adhering or settled carbon black. Overflow pipe 26 is provided for maintenance of a predetermined level of oil in the seal vessel 22. Pipe 26, as mentioned hereinbefore, leads the overflow oil from the seal vessel 22 to the surge tank 27.

Illustrated in FIGURE 2 is a second truncated conical member 44 disposed a spaced distance below truncated cone 43. The space between these two cones is identified by reference numeral 45. Communicating with this space is a pipe 42 which was used in operation of conventional electroprecipitators prior to this invention. It was through pipe 42 and space 45 that the inert gases were passed for attempting to provide a seal between the surface of oil 38 and the carbon black-containing gases in space 48. According to this present invention, pipe 42 and space 45 are not used. As a portion of this prior art apparatus, not now used, is a collar or cylinder 49 which, along with collar or cylinder 50, defines a portion of passageway 45.

A valved drain pipe 39 is provided, as illustrated, for drainage of oil from the seal zone in case removal of all oil is ever desired.

Thus, according to this invention, by introducing the oil tangentially into the seal zone below the surface of the body or lake of oil in the vessel and at a reasonably high velocity, carbon black which passes into the oil from space 48 is not permitted to settle or adhere against any metallic surface. The carbon black is kept in suspension and is ultimately removed through the overflow line 26. As hereinbefore mentioned, most of the carbon black contained in such a sealing oil does not readily settle, but any agglomerates or carbon black agglomerated into large particles which might settle are prevented from settling by this operation. When operating an electroprecipitator seal according to this invention, shutdowns because of seal zone short circuiting are very rare. In one operation, oil introduced tangentially into a seal zone as herein described permitted continuous electroprecipitator operation for a 3-month period without any shutdowns because of seal zone short circuiting. In the operation of such a carbon black producing system, the type of oil ordinarily used for the production of carbon black is frequently a solvent extract oil produced in the solvent extraction of a gas oil with a solvent selective for the extraction of aromatic hydrocarbons. In general, such an aromatic hydrocarbon-containing oil is considered a low grade oil as compared to a transformer oil. This latter oil is truly a high grade oil and predominates in paraffinic hydrocarbons, whereas the extract oil used in the production of carbon black is rich in aromatic hydrocarbons. Such an oil is well suited to the manufacture of furnace carbon black. I find, according to this invention, that such a low grade, aromatic-rich hydrocarbon oil is suitable for use in an oil seal zone of an electroprecipitator as herein described for providing an efficient seal between the electrical terminals and the carbon black containing gases of the precipitator.

While certain embodiments of the invention have been described for illustrative purposes, the invention obviously is not limited thereto.

I claim:

1. A method for operating a furnace carbon black production operation wherein carbon black is recovered from furnace effluents in a high potential electroprecipitator, the improvement comprising pumping only carbon black furnace charge oil and directly injecting it tangentially under the surface and into the lower portion of a body of said charge oil in an oil seal zone in liquid sealing relation between the electrical precipitation zone and the high potential electrical terminal containing zone of said precipitator thereby maintaining said body of oil in circulatory movement and eliminating settling of inadvertently entrained carbon black, withdrawing charge oil from the top of said oil seal zone and introducing this withdrawn charge oil and suspended carbon black into a carbon black production furnace.

2. A method for operating a furnace carbon black production operation wherein carbon black is recovered from furnace effluents in a high potential electroprecipitator, the improvement comprising providing a body of a carbon black furnace charge oil in an oil seal zone in liquid sealing relation between the electrical precipitation zone and the high potential electrical terminal containing zone of said precipitator, maintaining said body of oil in circulatory movement in said oil seal zone by pumping only carbon black furnace charge oil and directly injecting it tangentially under the surface and into the lower portion of said body of oil whereby carbon black inadvertently entrained in said body of oil is maintained in suspension therein, withdrawing charge oil from the top of said oil seal zone and introducing this withdrawn charge oil into a carbon black production furnace.

3. A method for operating a furnace carbon black production operation comprising dividing a stream of a carbon black furnace charge oil into two portions, continuously introducing one portion into a furnace carbon black production zone, removing effluent gases containing carbon black in suspension from said production zone and introducing same into a high electrical potential carbon black agglomeration zone, continuously pumping only the other portion of said charge oil and directly injecting it tangentially under the surface and into the lower portion of a body of said charge oil in an oil seal zone in liquid sealing relation between the electrical precipitation zone and the high potential electrical terminal containing zone of said agglomerization zone thereby maintaining said body of oil in a circulatory motion whereby carbon black inadvertently entrained in said oil is maintained in suspension therein, withdrawing charge oil containing suspended carbon black from the top of said oil seal zone and introducing the withdrawn charge oil and suspended carbon black into a carbon black production zone.

4. A method for operating a furnace carbon black production operation wherein carbon black is recovered from furnace effluents in a high potential electroprecipitator, comprising dividing a carbon black furnace charge oil into two portions, introducing one portion into a furnace carbon black production zone, providing a body of said carbon black furnace charge oil in an oil seal zone in liquid sealing relation between the electrical precipitation zone and the high potential electrical terminal containing zone of said precipitator, maintaining said body of oil in circulatory movement in said oil seal zone by pumping only the other portion of said charge oil and directly injecting it tangentially under the surface and into the lower portion of said body of oil thereby maintaining carbon black inadvertently entrained therein in suspension, withdrawing charge oil containing suspended carbon black from the top of said oil seal zone and introducing the withdrawn charge oil and suspended carbon black into said carbon black production zone.

References Cited in the file of this patent

UNITED STATES PATENTS

| | | |
|---|---|---|
| 895,795 | Sampson | Aug. 11, 1908 |
| 1,160,848 | Conklin | Nov. 16, 1915 |
| 1,765,991 | Miller | June 24, 1930 |
| 2,841,238 | Lenehan | July 1, 1958 |
| 2,901,324 | Howell | Aug. 25, 1959 |